March 1, 1960 TATUO NOJIRI 2,926,578
LENS TURRET MECHANISM FOR MOTION PICTURE CAMERAS
Filed May 23, 1956 2 Sheets-Sheet 1
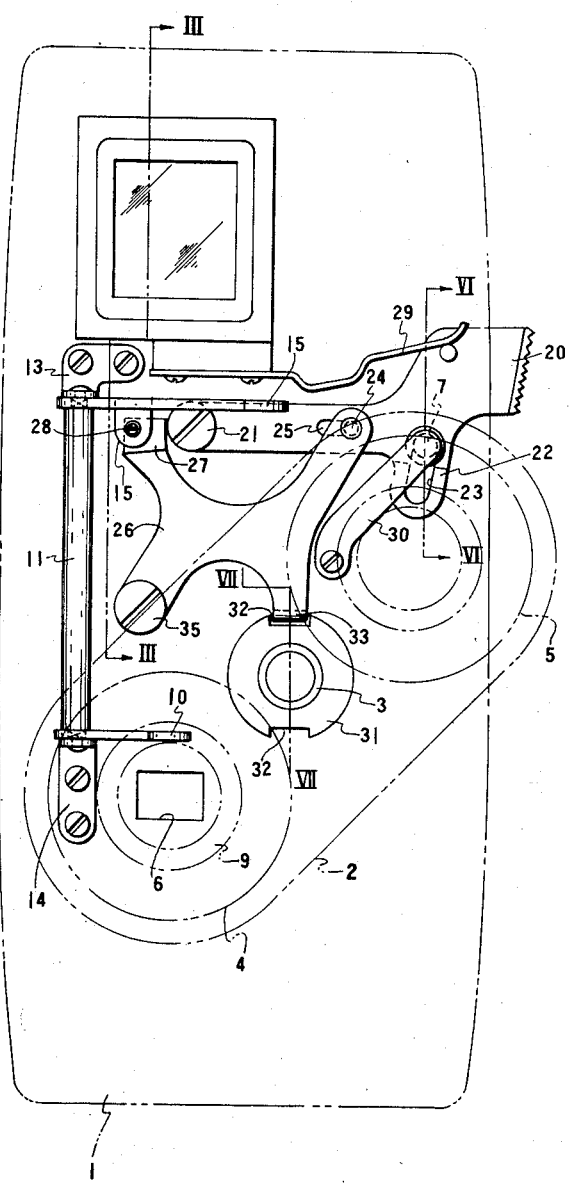
INVENTOR.
TATUO NOJIRI
BY
ATTORNEY

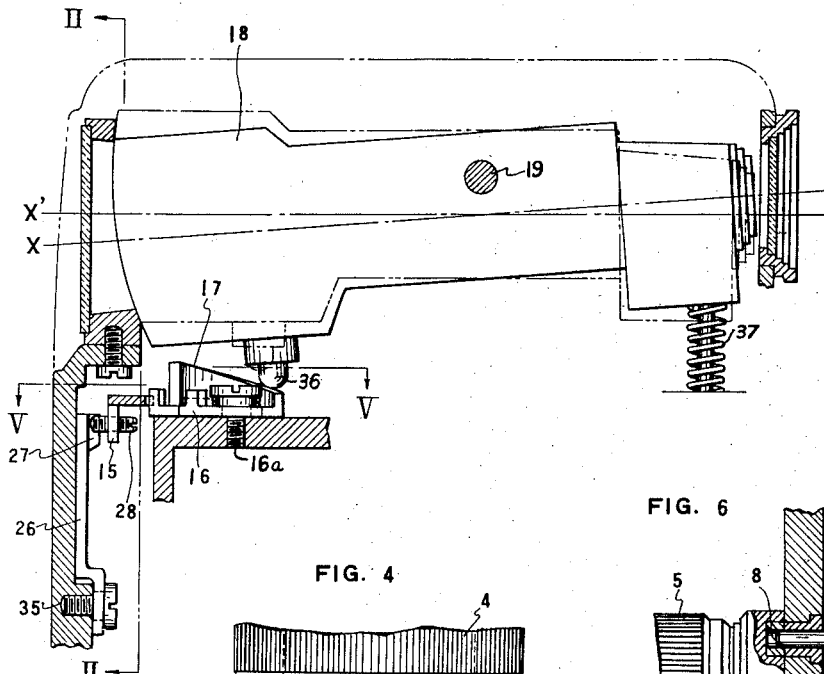
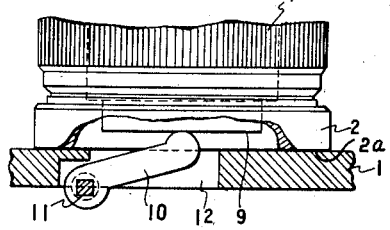
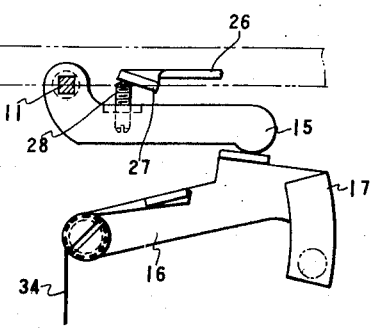
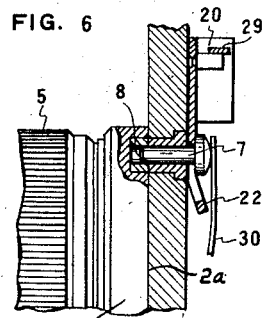
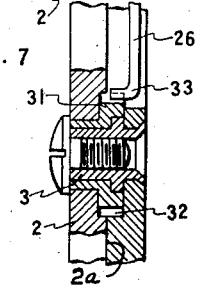
INVENTOR.
TATUO NOJIRI
BY
ATTORNEY United States Patent Office 2,926,578
Patented Mar. 1, 1960

2,926,578

LENS TURRET MECHANISM FOR MOTION PICTURE CAMERAS

Tatuo Nojiri, Todorokimachi, Setagayaku, Tokyo, Japan, assignor to Canon Camera Company, Inc., Otaku, Tokyo, Japan, a corporation of Japan Application May 23, 1956, Serial No. 586,692

Claims priority, application Japan September 15, 1955

7 Claims. (Cl. 95—44)

This invention relates to a lens carrier plate of the turret type on which are mounted a plurality of lenses for interchangeable use in cinematographic cameras.

It is known that in prior cinematographic cameras with turret mounted interchangeable lenses, parallax correction of the viewfinder or adjustment of the rangefinder is automatically controlled by the focusing operation of a lens mounted on a base plate of the rotatable turret type.

In such cameras, blocking means are necessary to attach the turrett plate securely to the camera housing in the predetermined positions wherein each of the lenses carried by the plate is selectively aligned with the exposure aperture of the camera. It is desirable, furthermore, to provide a lever or like member to couple the objective being focused to the finder, the lever extending to engage a focusing element of the objective mounted on such turret plate through an aperture of the camera so that the lever may, by focusing the objective, be actuated to operate the finder. In such case, however, it is necessary to withdraw the lever and to disengage the blocking means, so that the turret lens plate will not be obstructed by the coupling lever extending through the turret plate to the objectives mounted thereon when it is desired or required to change the objective lens used upon rotation of the turret plate.

An object of the invention is to provide means for disengaging the blocking means of a turret lens carrier or base plate and simultaneously withdrawing the coupling member between the objective and the finder to permit interchanging of the lenses in use with the camera lens aperture.

Another object of the invention is to simplify the construction of the turret plate blocking means, and of the coupling lever between the objective in use and the finder of the camera.

Still another object is to facilitate the blocking and unblocking operation of the turret lens carrier, while providing precise, exact and accurate blocking thereof to align the selected lens carried thereon with the lens aperture of the camera.

A clearer concept of this invention may be obtained from the following description, taken in connection with the attached drawing, in which Fig. 1 is a front view of a cinematographic camera with a turret lens carrier according to the instant invention;

Fig. 2 is an interior view of the turret operating mechanism and its coupling with the view finder on the line II—II of Fig. 3;

Fig. 3 is a longitudinal sectional view along the line III—III of Fig. 2;

Fig. 4 is a plan view of a lens of the turret carrier aligned with the aperture of the camera and its coupling member;

Fig. 5 is a plan view of the cam mechanism for tilting the camera viewfinder along the line V—V of Fig. 3;

Figs. 6 and 7 are respectively longitudinal sectional views along the line VI—VI and the line VII—VII of Fig. 2.

In the drawing, a turret base plate 2 is rotatably attached to a camera housing 1 by means of a shaft 3, and lenses 4 and 5 are fixed on base plate 2 by means of suitable mounts so that the desired objective lens, for example lens 4, may be positioned in alignment with the camera exposure aperture 6 by rotating the turret base plate 2. In order to fix the turret plate accurately and securely to align the axes of the desired objective and the exposure aperture of the camera, a pin 7 is provided, as shown in Fig. 6, extending from the interior of camera housing 1 through the camera wall to register within a bore 8 provided in the base plate 2. A coupling member or a lever 10 is provided which rides on a cam or cylindrical shoulder 9 attached to the barrel of lens 4 (Fig. 4), the coupling member being moved in accordance with the focusing of the lens. Lever 10 is affixed to a vertical shaft 11 inside the camera housing 1, the lever extending through an aperture 12 in the camera housing to engage and ride on cam shoulder surface 9 of the lens, the cam surface being positioned a slight distance from the sliding surface 2a of the base plate 2. The vertical shaft extends upwardly as shown in Fig. 2 and is journalled in upper and lower bearings 13 and 14.

Parallax of the viewfinder 18 is corrected by tilting the finder optical axis to predetermined positions between the two extreme positions X and X' designated in Fig. 3, by rotating the view finder on its supporting shaft 19. To this end a cam 17 is provided, integral with one end of a lever 16 pivoted on a shaft 16a in the camera housing, the lever 16 being biased by a spring 34 against the end of a lever 15 provided on the upper part of the vertical shaft 11 as shown in Fig. 5. It should be noted that other parallax correcting means, for instance by moving a finder mask, are possible. Also a rangefinder can be regulated by operatively connecting the rotatable cam 17 or the vertical shaft 11 to the appropriate elements of such range finder.

In the device of the instant invention it is necessary to withdraw the pin 7 from the bore 8 and to deflect the lever 10 from the path of the turret base plate 2 to permit unobstructed rotation of the plate to interchange the lens thereof and align another lens on the turret plate with the exposure aperture 6. To prevent obstruction by the lever 10, a turret releasing lever 20 (Fig. 2) is pivoted on a stub shaft 21, the lever having an inclined surface 22 (Fig. 6) formed with an elongated aperture 23 through which pin 7 extends. The head of pin 7 is of greater diameter than the width of the elongated aperture so that inclined surface 22 is between the inner surface of housing wall 1 and the under surface of the head. A pin 24, slidable in another elongated aperture 25 in lever 20, couples lever 20 to a pivotable multi-armed lever 26 from which the pin 24 extends. Multi-armed lever 26 is pivoted on pivot shaft 35 supported in the camera housing, and one of its arms has an inclined end surface 27 adapted to engage set screw 28 affixed to lever 15 (Fig. 5). The releasing lever 20 is biased downwardly by a spring 29 secured by suitable screws to the camera housing, the free end of the spring engaging a pin or projection in the outer upper end portion of the lever. The lever 20 upon being lifted by the upward movement of the user's finger against the tension of the spring 29, moves the inclined surface 22 upwardly to cam the head of pin 7 inwardly of the camera casing to withdraw pin 7 from bore 8 against the pressure of a spring finger 30 to release or unblock the base plate 2 to permit its rotation relative to the camera casing. At the same time, the multi-armed lever 26 is moved counterclockwise about its pivot shaft 35 through the linkage of pin 24 and aperture 25 in the releasing lever. The set screw 28 is moved by the inclined surface 27 of lever 26 to rotate the lever 15. The set screw 28 is adjustable in lever 15 to control the relative swing imparted to lever 15 by the releasing movement of lever 20. The lever 15 in rotating, rotates the vertical shaft 11 and consequently the coupling lever 10 to rotate the coupling lever away from the sliding surface 2a of the base plate 2 so that the lever is completely withdrawn therefrom. Thus the turret base plate 2 is free to be rotated to permit the interchange of lenses by turning the base plate 2 about its shaft 3. It is now quite obvious that turning and reblocking the base plate is smoothly operatable by the remarkably simple mechanism described.

Since the camera user is prone to remove his finger from the knurled end of lever 20 while rotating the base plate 2, the releasing lever will be turned by the tensioned spring 29 so that lever 10 and pin 7 again obstruct the smooth operation of the turret base plate in interchanging the lenses.

To prevent the restoration of the pin 7 and lever 10 to their blocking positions under the influence of springs 30 and 29, the releasing lever 20 must be maintained in its lifted position. To this end, means are provided as shown in Figs. 2 and 7 to prevent such inadvertent obstruction, comprising a stop disk 31 having diametrically opposite peripheral slots 32 integral with turret plate 2 and centered on shaft 3. A stop or latching member 33 integrally on an arm of the pivotable multi-armed lever 26 is also provided, the lifting of the lever 20, disengaging the latching member from one of the slots 32 which it engaged prior to lifting the releasing lever. The latching member 33 upon rotation of the turret base plate 2 to change the lenses, will ride on the periphery of stop disk 31 and prevent restoration of the multi-armed lever 26 and the releasing lever 20 until the latching member 33 engages the other slot 32 of the disk. When the turret base plate 2 has been turned exactly the correct amount, the other objective on the base plate will be in alignment with camera exposure aperture 6, the latching member 33 drops into a slot 32 of the stop disk due to the tension of spring 29 on lever 20, the forcing action being transmitted by the elongated aperture 25, and pin 24 to the multi-armed lever 26. As releasing lever 20 and multi-armed lever 26 turn clockwise (Fig. 2) when latch 33 enters a slot 32, the pin 7 is urged into the registering blocking bore 8 under the pressure of spring finger 30, the inclined surface 22, having been moved downwardly to free the head of the pin. At the same time, the set screw 28 on lever 15 is returned from its withdrawn position by the withdrawal of inclined end surface 27 and spring 34. Thus the turret 2 is securely blocked and locked in the proper position.

The focusing operation of the objective will rotate the camming shoulder 9 on the objective to swing the lever 10, thus rotating the vertical shaft 11 and lever 15 and consequently lever 16 and cam 17. The viewfinder 18 will thus be tilted about its supporting shaft 19 the proper amount through a cam follower pin 36 extending from the bottom of the viewfinder housing, the follower pin engaging cam 17 at all times under the influence of a viewfinder biasing spring 37 as shown in Fig. 3.

What I claim is:

1. In a cinematographic camera, a rotatable turret plate, at least two objective mounts supported in spaced relation thereon, an objective in each of said mounts, a cam on each objective spaced from the turret surface adjacent to the camera housing, an exposure aperture in the camera, a parallax correcting view finder, means extending through the camera wall coupling the cam of a selected objective with the viewfinder when the objective is aligned with the exposure aperture, first means extending through the camera housing wall latching the turret to the camera when a selected objective is aligned with the exposure aperture, second means latching the turret against rotation when a selected objective is aligned with the exposure aperture, and release means including a manually operable lever for simultaneously uncoupling the coupling means and unlatching both latching means to permit unobstructed rotation of the turret, said second latching means preventing restoration of said release means until a selected objective is aligned with the exposure aperture.

2. The combination according to claim 1 in which the means coupling the cam of the selected objective with the viewfinder comprises a vertical shaft, a second lever integral with the vertical shaft, the camera wall defining a second aperture through which the free end region of the second lever may extend into an objective mount on the turret to engage the cam of the objective, a third lever integral with the vertical shaft, a fourth lever pivoted on the camera housing, a first spring biasing the fourth lever against the third lever to move the second lever in the direction to engage with the cam of the objective, a cam integral with the free end of the fourth lever, a cam follower integral with the viewfinder housing and spring biased against the cam, a second spring biasing the manually operable lever, and a member coupled to the manually operable lever of which a portion engages the third lever and under the tension of the second spring permits the second lever to be moved in the direction to engage its free end region with the cam of the objective through the second aperture under the influence of the first spring.

3. In a cinematographic camera having a parallax correcting viewfinder adapted to be automatically coupled to and from a selected objective of a plurality of interchangeable objectives, the combination of a rotatable turret, at least two objective mounts supported in spaced relation thereon relative to each other, an objective in each mount, the camera ends of the objectives being spaced from the surface of the turret adjacent to the camera, an exposure aperture in the camera front wall, an axially movable pin extending through the camera front wall, a first spring biasing the pin to extend beyond the front wall, a bore in the turret for each objective mount and adapted to receive the pin when a selected objective exactly registers with the exposure aperture, a vertical rotatable shaft supported within the camera, a second aperture in the camera front wall, a first lever integral with the vertical shaft of which the free end extends through the second aperture to engage the camera end region of the objective in registry with the exposure aperture whereby focusing of the objective actuates the first lever correspondingly to rotate the vertical shaft, a second lever integral with the vertical shaft and spaced from the first lever, a third lever pivoted on the camera housing, a second spring biasing the third lever against the second lever to tend to move the second lever in the direction to engage the first lever with the camera end region of the objective, a cam integral with the free end of the third lever, a cam follower projecting from the viewfinder and spring biased against the cam, a fourth multi-armed lever pivoted on the camera, a first arm of the multi-armed lever having an inclined surface at its free end and bearing against the second lever to move it in the direction opposite to that in which the second lever is biased by the third lever to pivot the first lever into the second aperture, a second arm of the multi-armed lever having its free end in the form of a stop, a fifth lever pivoted on the camera housing with a free end extending outside the camera housing, a third arm of the multi-armed lever coupling the latter to the fifth lever, a third spring biasing the fifth lever downwardly, an extension integral with the fifth lever having an inclined cam surface thereon and formed with an elongated slot for receiving the pin, the inclined cam surface being adapted on upward movement of the fifth lever to withdraw the axially movable pin from the turret bore to within the camera wall against the bias of the first spring, manual upward movement of the free end of the fifth lever simultaneously withdrawing the free end of the first lever into the second aperture, a disk integral with the rotatable turret, and a longitudinal slot in the cylindrical surface of the disk for each objective mount on the turret and so positioned that when the free end of the second arm of the multi-armed fourth lever registers with a slot the selected objective registers with the exposure aperture and the pin registers with the bore, such free end of the second arm being pressed into the slot in the normal position of the fifth lever under the bias of the third spring and being withdrawn from the slot on upward movement of the fifth lever to permit unobstructed manual rotation of the turret plate, during which rotation the pin is held withdrawn from the bore and within the camera wall until the second arm again registers with a slot in the disk to permit the free end of the second arm to enter the slot and the first lever to engage the camera end of the selected objective under the tension of the third spring and the pin to enter the bore under the bias of the first spring.

4. The combination according to claim 3 in which the second lever has an adjustable stop against which the inclined surface of the first arm of the multi-armed fourth lever bears to control the throw of the second lever on upward movement of the fifth lever.

5. The combination according to claim 1, in which the first latching means extending through the camera wall includes a pin having an enlarged head, a bore in the turret plate adapted to receive the other end portion of the pin when an objective is aligned with the exposure aperture, and in which the manually operable lever comprises an inclined camming surface integral therewith, the lever camming surface being interposed under the head of the pin, a spring biasing the head of said pin against the lever camming surface, and a second spring biasing the manually operable lever to one extreme position wherein the low portion of the inclined camming surface is engaged by the head of the pin, the other end portion of the pin extending into the bore, movement of the manually operable lever against the bias of the second spring toward a second extreme position moving the high portion of the inclined camming surface under the head of the pin to withdraw the pin end portion from the bore in the turret plate.

6. The combination according to claim 1, wherein the second latching means includes a stop disk rotatable with the turret plate, a peripheral groove in the stop disk for each objective mount on the turret plate, a multi-armed lever pivoted to the camera wall, a first arm on said lever being coupled to the manually operable lever, a second arm on said lever having a free end cooperating with the periphery of said stop disk, a spring biasing the manually operable lever to one extreme position, the biasing force of said spring maintaining the second arm of said multi-armed lever in engagement with the periphery of the stop disk, the free end of said second arm registering in a peripheral groove when an objective carried by said turret plate is in alignment with the exposure aperture of the camera, movement of the manually operable lever toward its second extreme position against the bias of said spring pivoting the multi-armed lever to withdraw the free end of the second arm from the peripheral groove.

7. The combination according to claim 1, in which the first latching means extending through the camera wall includes a pin having an enlarged head, a bore in the turret plate adapted to receive the other end region of the pin when an objective is aligned with the exposure aperture, an inclined camming surface integral with the manually operable lever, the lever camming surface being interposed under the head of the pin, a first spring biasing the head of the pin against the lever camming surface, a second spring biasing the manually operable lever to one extreme position wherein the low portion of the inclined camming surface is engaged by the head of the pin, the other end of the pin registering in the bore; movement of the manually operable lever against the bias of the second spring toward a second extreme position moving the high portion of the inclined camming surface under the head of the pin to withdraw the other end portion of the pin from the turret plate bore, and in which the second latching means includes a stop disk rotatable with the turret plate, a peripheral groove in the stop disk for each objective of the turret plate, a multi-armed lever pivoted to the camera wall, a first arm on said last lever being coupled to the manually operable lever, a second arm on said lever having a free end cooperating with the periphery of said stop disk, the biasing force of said second spring acting upon the multi-armed lever to maintain the second arm thereof in engagement with the periphery of the stop disk, the free end of said second arm registering in a peripheral groove when an objective on said turret plate is aligned with the exposure aperture, movement of the manually operable lever against the bias of the second spring pivoting the multi-armed lever to withdraw the free end of the second arm from the peripheral groove, the engagement of the free end of the arm with the stop disk periphery during rotation of the turret plate maintaining the manually operable lever in its second extreme position to maintain the high portion of the inclined camming surface under the head of said pin to hold said pin in its withdrawn position.

References Cited in the file of this patent

UNITED STATES PATENTS

| 2,467,456 | Baer | Apr. 19, 1949 |
| 2,640,777 | Fachman | June 2, 1953 |
| 2,720,145 | Goodfellow | Oct. 11, 1955 |

FOREIGN PATENTS

| 703,215 | Germany | Mar. 4, 1941 |
| 237,011 | Switzerland | July 16, 1945 |